United States Patent
Kawai et al.

(10) Patent No.: US 12,400,821 B2
(45) Date of Patent: Aug. 26, 2025

(54) METASURFACE ELEMENT, ELECTRON TUBE, AND METHOD FOR PRODUCING ELECTRON TUBE

(71) Applicant: HAMAMATSU PHOTONICS K.K., Hamamatsu (JP)

(72) Inventors: Naoya Kawai, Hamamatsu (JP); Hideaki Yoshiara, Hamamatsu (JP); Yuya Suzuki, Hamamatsu (JP); Genki Nakagomi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 234 days.

(21) Appl. No.: 18/025,223

(22) PCT Filed: Sep. 28, 2021

(86) PCT No.: PCT/JP2021/035720
§ 371 (c)(1),
(2) Date: Mar. 8, 2023

(87) PCT Pub. No.: WO2022/102268
PCT Pub. Date: May 19, 2022

(65) Prior Publication Data
US 2024/0021398 A1 Jan. 18, 2024

(30) Foreign Application Priority Data
Nov. 12, 2020 (EP) ..................................... 20207267

(51) Int. Cl.
*H01J 1/32* (2006.01)
*H01J 1/34* (2006.01)
(Continued)

(52) U.S. Cl.
CPC ................ *H01J 1/32* (2013.01); *H01J 43/02* (2013.01); *H01J 43/28* (2013.01)

(58) Field of Classification Search
CPC .... H01J 1/32; H01J 43/02; H01J 43/28; H01J 1/34
See application file for complete search history.

(56) References Cited

U.S. PATENT DOCUMENTS

| 4,233,936 A | 11/1980 | Longsderff et al. |
| 5,118,952 A | 6/1992 | Sakamoto et al. |

(Continued)

FOREIGN PATENT DOCUMENTS

| EP | 0558308 A1 | 9/1993 |
| JP | S63-047928 A | 2/1988 |

(Continued)

OTHER PUBLICATIONS

Anonymous, "Metamaterial—Wikipedia, URL:https://en.wikipedia.org/wiki/Metamaterial," XP055644408, Nov. 11, 2019, pp. 1-21.

(Continued)

*Primary Examiner* — Joseph L Williams
(74) *Attorney, Agent, or Firm* — Faegre Drinker Biddle & Reath LLP

(57) ABSTRACT

A metasurface element includes a support body and a metasurface formed on a surface of the support body. The metasurface includes a metal pattern that is disposed to emit an electron in response to incidence of an electromagnetic wave, and a metal layer that contains an alkali metal and is formed on the metal pattern. The metal layer extends beyond the metal pattern to reach a region on the surface of the support body, the region being not formed with the metal pattern.

19 Claims, 11 Drawing Sheets

(51) Int. Cl.
  *H01J 43/02*  (2006.01)
  *H01J 43/28*  (2006.01)

(56) References Cited

U.S. PATENT DOCUMENTS

| | | |
|---|---|---|
| 6,054,718 A | 4/2000 | Dodd et al. |
| 2016/0216201 A1 | 7/2016 | Iwaszczuk et al. |
| 2018/0151338 A1 | 5/2018 | Conley |
| 2022/0415638 A1* | 12/2022 | Fujita .................... H01J 43/18 |

FOREIGN PATENT DOCUMENTS

| | | |
|---|---|---|
| JP | H7-073801 A | 3/1995 |
| JP | 2000-011856 A | 1/2000 |
| JP | 2001-072439 A | 3/2001 |
| WO | WO-2012/078043 A1 | 6/2012 |
| WO | WO-2015/028029 A1 | 3/2015 |

OTHER PUBLICATIONS

Anonymous, "Electromagnetic metasurface—Wikipedia, URL:https://en.wikipedia.org/wiki/Electromagnetic_metasurface," XP055716025, Jul. 8, 2020.

Anonymous, "Terahertz metamaterial—Wikipedia, URL:https://en.wikipedia.org/wiki/Terahertz_metamaterial," XP055644415, Sep. 29, 2019.

Written Opinion of the International Searching Authority mailed Jan. 4, 2022 for PCT/JP2021/035720.

* cited by examiner

METASURFACE ELEMENT, ELECTRON TUBE, AND METHOD FOR PRODUCING ELECTRON TUBE

TECHNICAL FIELD

One aspect of the present disclosure relates to a metasurface element, an electron tube, and a method for producing an electron tube.

BACKGROUND ART

U.S. Unexamined Patent Publication No. 2016/0216201 discloses a detection system that detects a terahertz wave. In the detection system, the terahertz wave is incident on a metal layer having a metamaterial structure. When the terahertz wave is incident on the metal layer, electrons are emitted. The emitted electrons react with a surrounding gas to generate light. When the light is detected, the terahertz wave can be detected.

SUMMARY OF INVENTION

Technical Problem

A metasurface element that emits electrons in response to the incidence of an electromagnetic wave is required to have improved sensitivity (electron emission ability). Therefore, an object of one aspect of the present disclosure is to provide a metasurface element and an electron tube having improved sensitivity and a method for producing such an electron tube.

Solution to Problem

According to one aspect of the present disclosure, there is provided a metasurface element including: a support body; and a metasurface formed on a surface of the support body. The metasurface includes a metal pattern that is disposed to emit an electron in response to incidence of an electromagnetic wave, and a metal layer that contains an alkali metal and is formed on the metal pattern. The metal layer extends beyond the metal pattern to reach a region on the surface of the support body, the region being not formed with the metal pattern.

In the metasurface element, the metal layer containing the alkali metal is formed on the metal pattern. Accordingly, the band structure at the surface of the metal pattern can be distorted to reduce the work function, and a potential barrier can be thinned. As a result, the probability of tunneling can be increased, and the sensitivity (electron emission ability) can be improved. In addition, in the metasurface element, the metal layer containing the alkali metal is provided not only on the metal pattern but also in the region on the surface of the support body, the region being not formed with the metal pattern. Accordingly, the resistance value of the surface of the support body can be reduced, and the occurrence of charge-up on the metal pattern can be suppressed. As a result, an event that it becomes difficult for the metasurface to emit an electron due to the charge-up can be suppressed. The sensitivity of the metasurface element is improved by the above configuration.

The metal layer may be a monatomic layer of the alkali metal. In this case, the work function at the surface of the metal pattern can be effectively reduced.

The metal layer may contain an oxide of the alkali metal. In this case, the work function at the surface of the metal pattern can be more effectively reduced.

The alkali metal may be cesium. In this case, the work function at the surface of the metal pattern can be more effectively reduced.

A material of the metal pattern may include gold, platinum, aluminum, graphene, silver, or copper. In this case, the conductivity of the metal pattern can be greatly secured.

The metasurface may include only metal patterns having the same potential as the metal pattern. In this case, since the insulating property between the metal patterns is not required to be considered, the metal layer can be easily provided in the region on the surface of the support body, the region being not formed with the metal pattern.

The support body may be made of silicon, quartz, sapphire, or zinc selenide. In this case, an electromagnetic wave in a frequency band included in the band from a millimeter wave to infrared light can be transmitted through the support body, and the electromagnetic wave can be incident on the metasurface via the support body.

According to one aspect of the present disclosure, there is provided an electron tube including: the metasurface element; a housing that includes a first window portion through which the electromagnetic wave is transmitted, and accommodates the metasurface element; and an electron multiplier that is disposed inside the housing to multiply an electron emitted from the metasurface element. In the electron tube, the sensitivity is improved due to the above-described reason.

An inside of the housing may be a vacuum. In this case, a residual gas inside the housing can be adsorbed by the metal layer (getter effect), so that the degree of vacuum inside the housing can be increased.

The electron tube according to one aspect of the present disclosure may further include an alkali metal dispenser that is disposed inside the housing to emit the alkali metal when energized. In this case, during production, the alkali metal vaporized by the energization of the alkali metal dispenser can be emitted.

The electron tube according to one aspect of the present disclosure may further include a monitoring member that is disposed inside the housing to emit an electron in response to incidence of a monitoring electromagnetic wave having a wavelength different from a wavelength of the electromagnetic wave. The housing may include a second window portion through which the monitoring electromagnetic wave is transmitted. In this case, during production, the monitoring electromagnetic wave is incident on the monitoring member, and the quantity of the electron emitted from the monitoring member is monitored, so that a change in work function at the surface of the metal pattern can be identified.

According to one aspect of the present disclosure, there is provided a method for producing an electron tube, the method including: a first step of disposing a metasurface element and an alkali supply source inside a housing, in which the metasurface element includes a support body and a metasurface that is formed on a surface of the support body and includes a metal pattern that is disposed to emit an electron in response to incidence of an electromagnetic wave; and a second step of causing the alkali supply source to emit a vaporized alkali metal, and heating the housing to disperse the alkali metal inside the housing to form a metal layer on the metal pattern, the metal layer containing the alkali metal.

In the method for producing an electron tube, the vaporized alkali metal is emitted from the alkali supply source, and the housing is heated to disperse the alkali metal inside the housing to form the metal layer on the metal pattern, the metal layer containing the alkali metal. Since the housing is heated to disperse the alkali metal inside the housing, the metal layer can be reliably formed on the metal pattern. Therefore, according to the method for producing an electron tube, the metal layer containing the alkali metal can be suitably formed on the metal pattern. As a result, the electron tube having improved sensitivity as described above can be produced.

The alkali supply source may be an alkali metal dispenser that emits the alkali metal when energized. In this case, the amount of energization, the time of energization, or the like of the alkali metal dispenser can be adjusted to control the quantity of the alkali metal emitted, so that the metal layer can be formed with good reproducibility.

In the second step, oxygen may be supplied into the housing to form the metal layer on the metal pattern, the metal layer containing an oxide of the alkali metal. In this case, the metal layer containing an oxide of the alkali metal can be formed on the metal pattern.

In the second step, a coil that is disposed outside the housing to surround the housing may be energized to heat the housing. In this case, the housing can be effectively heated.

In the second step, an inside of the housing may be a vacuum. In this case, a residual gas inside the housing can be adsorbed by the metal layer (getter effect), so that the degree of vacuum inside the housing can be increased.

In the first step, a monitoring member that emits an electron in response to incidence of a monitoring electromagnetic wave having a wavelength different from a wavelength of the electromagnetic wave may be further disposed inside the housing. In the second step, while the monitoring electromagnetic wave is incident on the monitoring member and a quantity of the electron emitted from the monitoring member is monitored, the alkali supply source may be caused to emit the alkali metal. In this case, the quantity of the electron emitted from the monitoring member is monitored, so that a change in work function at the surface of the metal pattern can be identified. As a result, the metal layer can be formed with better reproducibility.

In the first step, the metasurface element and the alkali supply source may be disposed inside the housing such that the metasurface element is separated from the alkali supply source. In the second step, a part of the housing may be heated, the part surrounding the alkali supply source. In this case, since the part of the housing is heated, the part surrounding the alkali supply source, the metal pattern can be suppressed from being heated. As a result, the metal pattern and the metal layer can be suppressed from being alloyed, so that the metal layer can be more suitably formed.

Advantageous Effects of Invention

According to one aspect of the present disclosure, it is possible to provide the metasurface element and the electron tube having improved sensitivity and the method for producing such an electron tube.

DESCRIPTION OF EMBODIMENTS

Hereinafter, one embodiment of the present invention will be described in detail with reference to the drawings. Incidentally, in the following description, the same reference signs are used for the same or equivalent components and duplicated descriptions will be omitted.

Entire Configuration of Electron Tube

Figure 1:
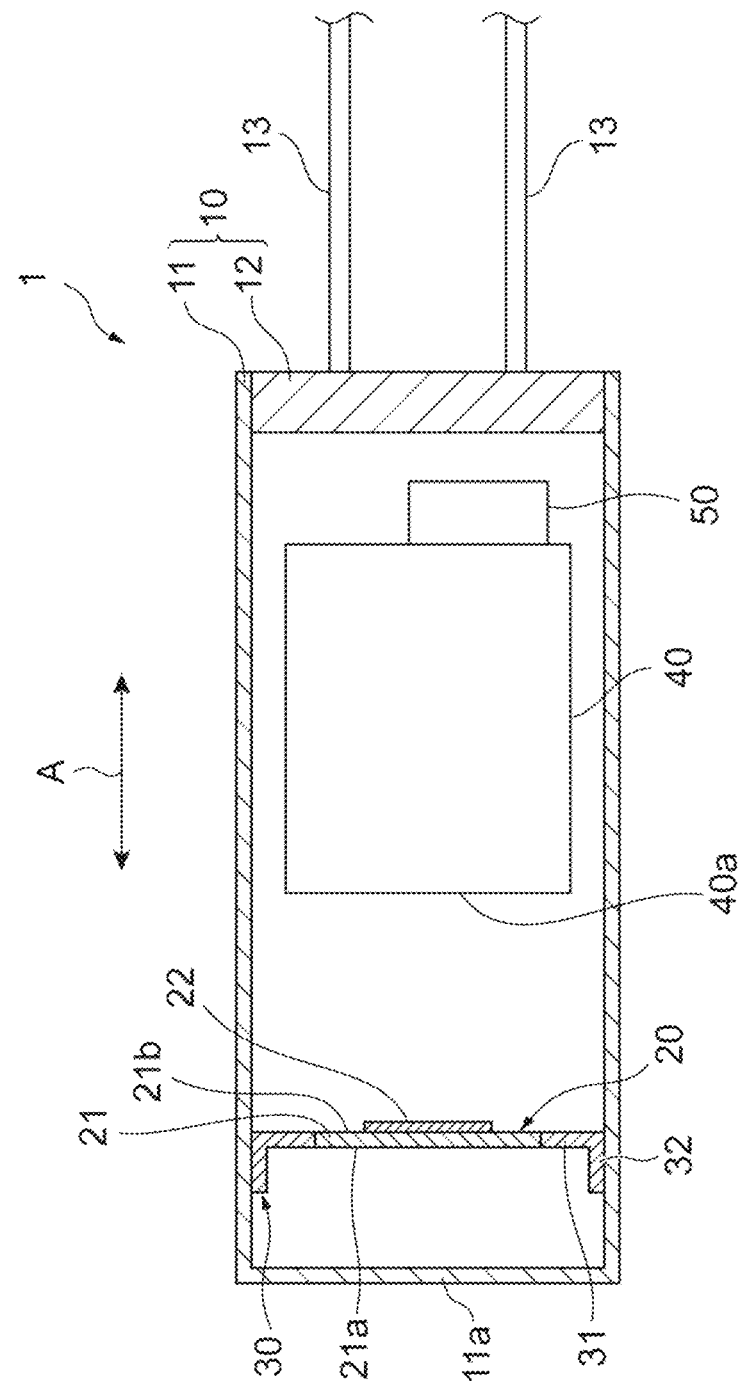
FIG. 1 is a cross-sectional view of an electron tube according to an embodiment.
Figure 2:
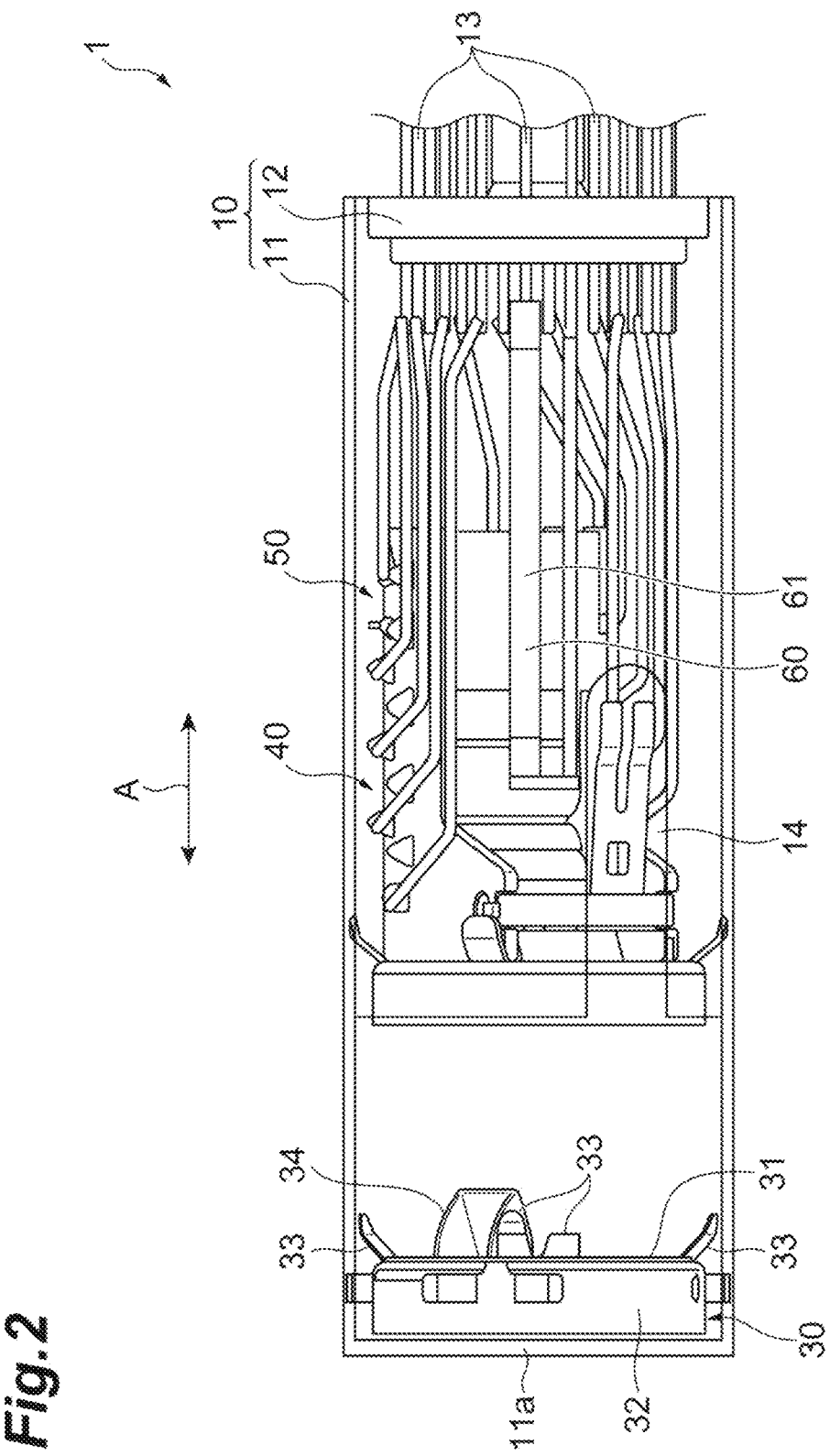
FIG. 2 is a side view of the electron tube.
Figure 3:
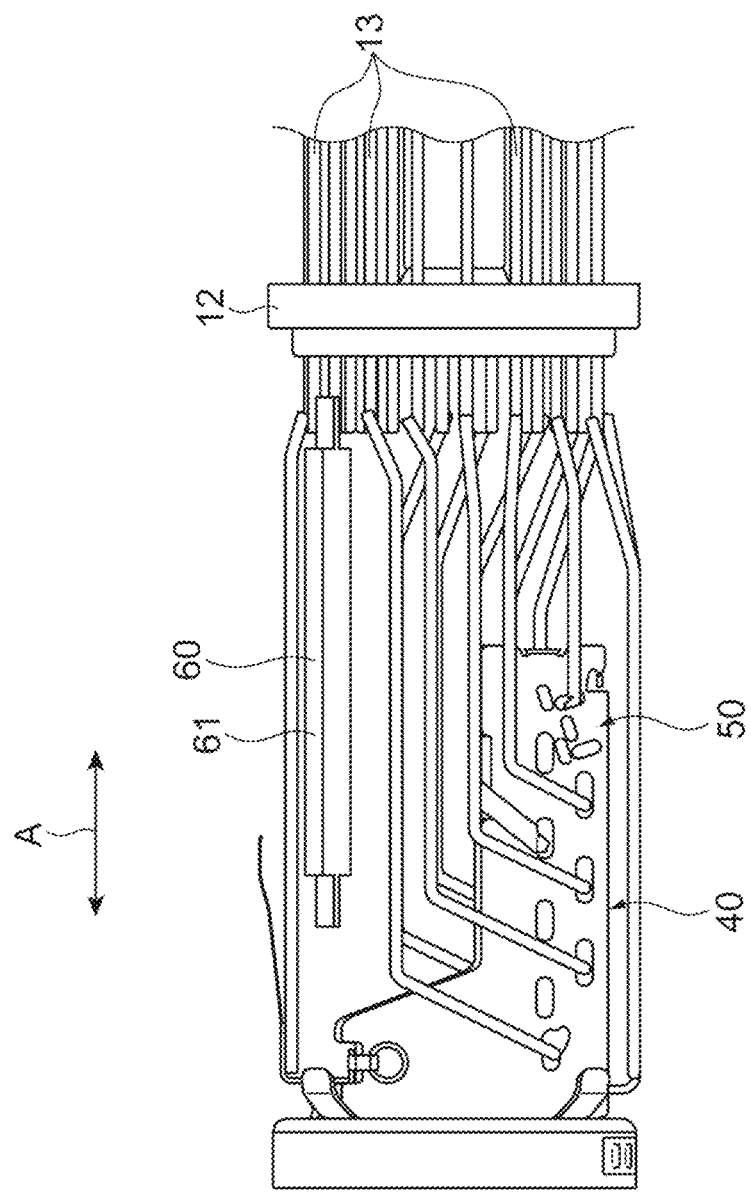
FIG. 3 is a partial side view of the electron tube.
Figure 3:
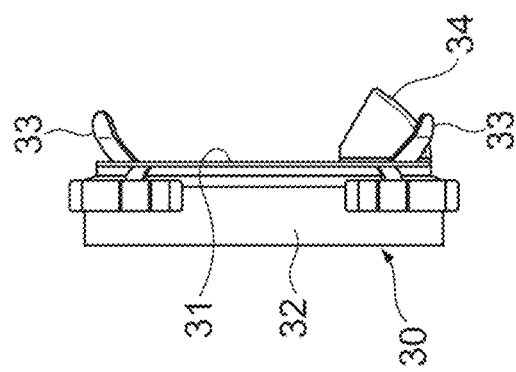

An electron tube 1 illustrated in FIGS. 1 to 3 is configured as a photomultiplier tube (PMT) that outputs an electric signal in response to the incidence of an electromagnetic wave. The electron tube 1 has sensitivity for, for example, an electromagnetic wave in a frequency band from a millimeter wave to infrared light. When the electromagnetic wave is incident into the electron tube 1, electrons are emitted inside the electron tube 1 and the emitted electrons are multiplied. In the electron tube 1, the electromagnetic wave is incident on a photoelectric surface, and electrons are emitted from the photoelectric surface due to a tunnel effect (field emission) caused by an intense electric field.

The electron tube 1 includes a housing 10, a metasurface element 20, a holding unit 30, an electron multiplier 40, and an electron collector 50. The metasurface element 20, the holding unit 30, the electron multiplier 40, and the electron collector 50 are disposed inside the housing 10.

The housing 10 includes a valve 11 and a stein 12. The housing 10 is formed in, for example, a cylindrical shape. The housing 10 is airtightly sealed by the valve 11 and the stein 12, and the inside of the housing 10 is held in vacuum. The vacuum in the housing 10 may be an absolute vacuum, or may be filled with a gas of pressure lower than the atmospheric pressure. For example, the internal pressure of the housing 10 may be held at $1 \times 10^{-4}$ to $1 \times 10^{-7}$ Pa. In FIG. 3, the illustration of the valve 11 is omitted.

A part of the valve 11 forms a window portion (first window portion) 11a through which the electromagnetic wave is transmitted. The window portion 11a forms a top surface of the housing 10 (one end surface of the housing 10 in an axial direction A). The window portion 11a is formed in, for example, a circular flat plate shape perpendicular to the axial direction A. The window portion 11a is transmissive to the electromagnetic wave, and transmits at least a part of the frequency band of the electromagnetic wave incident on the window portion 11a. The stein 12 forms a bottom surface of the housing 10 (the other end surface of the housing 10 in the axial direction A). The stein 12 is formed in, for example, a circular flat plate shape perpendicular to the axial direction A, and is disposed to overlap the window portion 11a when viewed in the axial direction A.

The window portion 11a is made of a material depending on the frequency band of the electromagnetic wave incident into the electron tube 1. For example, the material of the window portion 11a includes at least one selected from quartz, silicon, germanium, sapphire, zinc selenide, zinc sulfide, magnesium fluoride, lithium fluoride, barium fluoride, calcium fluoride, magnesium oxide, calcium carbonate, and chalcogenide glass. Accordingly, the electromagnetic wave in a certain band selected from the frequency band from a millimeter wave to infrared light can be guided into the housing 10. For example, quartz is suitable for transmitting a frequency band of 0.1 THz to 5 THz, silicon is suitable for transmitting a frequency band of 0.04 THz to 11 THz and 46 THz or more, magnesium fluoride is suitable for transmitting a frequency band of 40 THz or more, germanium is suitable for transmitting a frequency band of 13 THz or more, and zinc selenide is suitable for transmitting a frequency band of 14 THz or more.

The housing 10 further includes a plurality of wirings 13 for electrical connection between the inside and the outside of the housing 10. Each of the wirings 13 is, for example, a lead wire or pin. In this example, each of the wirings 13 is a pin that penetrates through the stein 12 along the axial direction A. Each of the wirings 13 is electrically connected to various members provided inside the housing 10.

The metasurface element 20 emits electrons in response to the incidence of the electromagnetic wave. The metasurface element 20 includes a support body 21 and a metasurface 22. The metasurface element 20 is formed in, for example, a substantially rectangular plate shape.

The support body 21 is, for example, a rectangular plate-shaped substrate. The support body 21 has a first surface 21a and a second surface 21b opposite to the first surface 21a. In this example, each of the first surface 21a and the second surface 21b is a flat surface parallel to the window portion 11a. The first surface 21a faces the window portion 11a at an interval therefrom. The electromagnetic wave transmitted through the window portion 11a is incident on the first surface 21a. The support body 21 is transmissive to the electromagnetic wave transmitted through the window portion 11a, and transmits at least a part of the frequency band of the electromagnetic wave transmitted through the window portion 11a.

The support body 21 is made of, for example, silicon, quartz, sapphire, or zinc selenide (ZnSe). The support body 21 is disposed to be separated from the window portion 11a and the electron multiplier 40 in the axial direction A. The metasurface 22 is provided on the second surface 21b of the support body 21. The electromagnetic wave transmitted through the window portion 11a and the support body 21 is incident on the metasurface 22. The metasurface 22 will be described in detail later.

As illustrated in FIGS. 1 to 5, the holding unit 30 holds the metasurface element 20. The holding unit 30 includes a bottom wall portion 31 having a annular plate shape and a side wall portion 32 that has a cylindrical shape and extends from an outer edge of the bottom wall portion 31. A disposition portion 31a having a shape corresponding to the external shape of the metasurface element 20 is formed in a central portion of the bottom wall portion 31, and the metasurface element 20 is disposed inside the disposition portion 31a. In this example, the disposition portion 31a is formed of an opening formed in the bottom wall portion 31.

The holding unit 30 is fixed to an inner peripheral surface of the valve 11, and positions the metasurface element 20 with respect to the housing 10. For example, the holding unit 30 is positioned with respect to the housing 10 such that an optical axis of the electromagnetic wave passing through the disposition portion 31a is parallel to a tube axis (axial direction A) of the housing 10. The holding unit 30 includes a plurality of (four in this example) terminals 33. At least one of the plurality of terminals 33 is electrically connected to the wiring 13 via a conduction layer 14, and a voltage is applied to the metasurface element 20 via the wiring 13, the conduction layer 14, and the terminal 33. The conduction layer 14 is formed on an inner peripheral surface of the valve 11.

A monitoring member 34 is provided on the bottom wall portion 31 of the holding unit 30. During production of the electron tube 1, a monitoring electromagnetic wave having a wavelength different from the wavelength of the electromagnetic wave incident on the metasurface element 20 is incident on the monitoring member 34. A method for producing the electron tube 1 will be described later.

The monitoring member 34 is disposed adjacent to the metasurface element 20 on a surface on the electron multiplier 40 side (side opposite to the window portion 11a and the side wall portion 32) of the bottom wall portion 31. The monitoring member 34 is, for example, an electrode in which a metal film is formed on a base material. In this example, the metal film is made of the same metallic material as a metallic material forming a metal pattern 24, to be described later, of the metasurface 22. As one example, the material of the metal film is gold, and the material of the base material is beryllium copper (CuBe).

In addition, a through-hole 31b is formed in the bottom wall portion 31. The through-hole 31b penetrates through the bottom wall portion 31 along the axial direction A. The monitoring member 34 is disposed such that the monitoring electromagnetic wave passing through the through-hole 31b is incident on the monitoring member 34. The monitoring electromagnetic wave is transmitted through the window portion 11a to enter the housing 10, and then passes through the through-hole 31b to be incident on the monitoring member 34. Namely, the window portion 11a also serves as a second window portion through which the monitoring electromagnetic wave is transmitted. The monitoring member 34 is electrically connected to an electrode 23, to be described later, of the metasurface 22, and has the same potential as that of the electrode 23.

The electron multiplier 40 multiplies electrons emitted from the metasurface element 20. The electron multiplier 40 has an incident surface 40a that faces the second surface 21b of the support body 21 of the metasurface element 20 at an interval from the second surface 21b. The electron multiplier 40 multiplies electrons that are emitted from the metasurface element 20 to be incident on the incident surface 40a. The electron multiplier 40 is configured as, for example, a so-called line focus type, and includes a plurality of stages (for example, ten stages) of dynodes. The uppermost dynode includes the incident surface 40a described above. Each of the dynodes is electrically connected to the wiring 13, and a predetermined potential is applied to each of the dynodes via the wiring 13. The dynode multiplies electrons in accordance with the applied potential.

The electron collector 50 collects the electrons multiplied by the electron multiplier 40. The electron collector 50 includes, for example, an anode that is disposed to receive the electrons from the dynode in the last stage of the electron multiplier 40. The anode is electrically connected to the wiring 13, and a predetermined potential is applied to the anode via the wiring 13. The anode captures the electrons multiplied by the dynodes. The electron collector 50 may include a diode (avalanche diode or the like) instead of the anode.

The electron tube 1 further includes an alkali metal dispenser (AMD) 60 disposed inside the housing 10. The alkali metal dispenser 60 is an alkali supply source that emits an alkali metal when energized. The alkali metal dispenser 60 is used during production of the electron tube 1 as will be described later. The method for producing the electron tube 1 will be described later. The alkali metal dispenser 60 is formed in, for example, a bar shape, and extends along the axial direction A. The alkali metal dispenser 60 is disposed in a space between the electron multiplier 40 and the inner surface of the housing 10 (inner peripheral surface of the valve 11), and extends toward the stein 12. The alkali metal dispenser 60 is separated from the metasurface element 20 in the axial direction A.

The alkali metal dispenser 60 includes an accommodation member 61 made of a metallic material, and the alkali metal is accommodated in the accommodation member 61. As one example, the material of the accommodation member 61 is nickel and chromium, and the alkali metal accommodated is cesium. The accommodation member 61 is electrically connected to the wiring 13. When current flows through the accommodation member 61 via the wiring 13, the accommodation member 61 is resistance heated, and the alkali metal vaporized is emitted from the accommodation member 61. The amount of energization or the time of energization of the accommodation member 61 can be adjusted to control the quantity of the alkali metal emitted.

An emission port through which the alkali metal is emitted is formed in the accommodation member 61. The emission port faces the inner peripheral surface of the valve 11. For this reason, the alkali metal is emitted from the accommodation member 61 toward the inner peripheral surface of the valve 11. Accordingly, in a production process to be described later, the alkali metal is suppressed from being adsorbed on the electron multiplier 40 or the electron collector 50; and thereby, the probability of adsorption of the alkali metal on the metal pattern 24 can be increased.

Configuration of Metasurface Element

Figure 4:
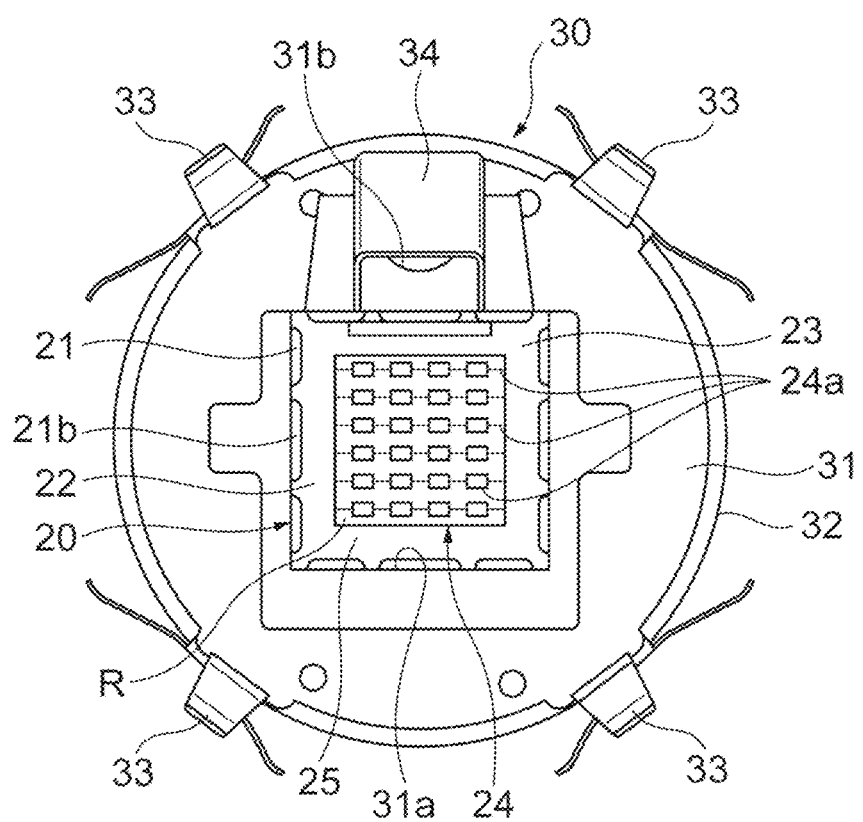
FIG. 4 is a plan view of a holding unit.
Figure 5:
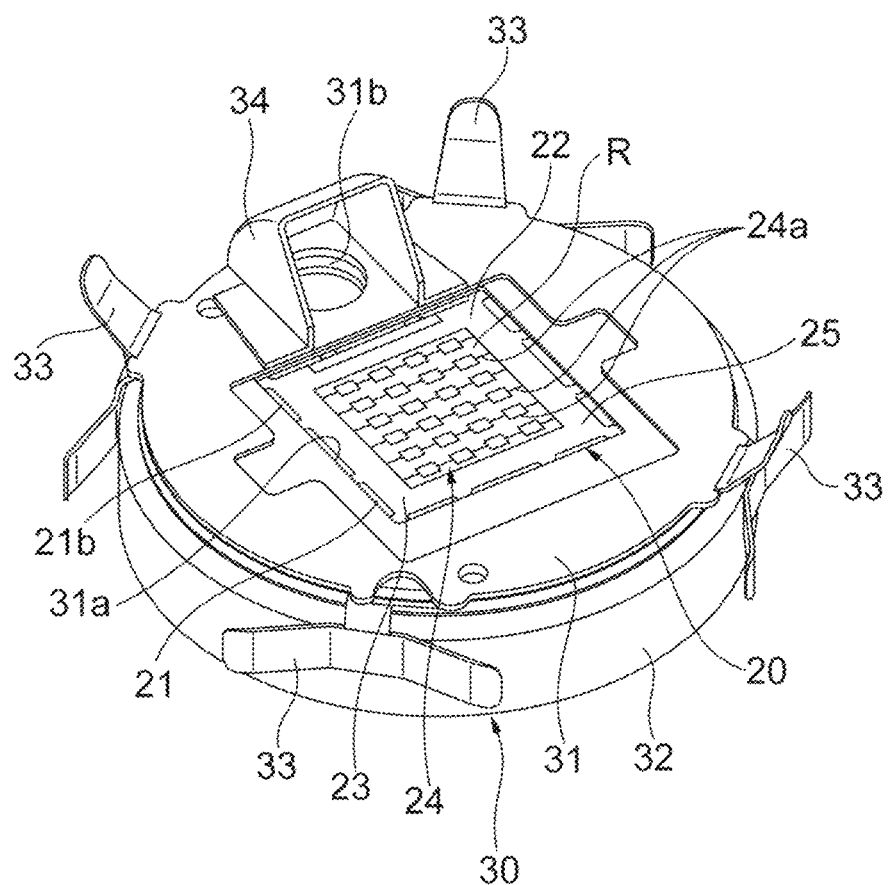
FIG. 5 is a perspective view of the holding unit.
Figure 6:
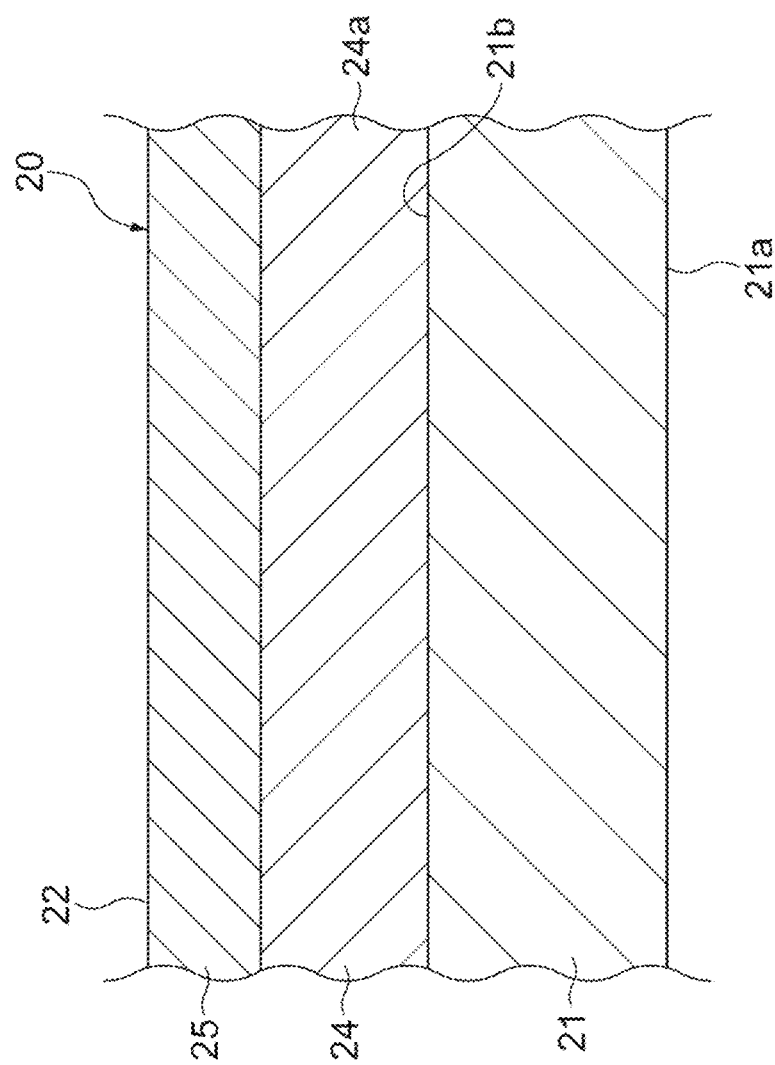
FIG. 6 is a cross-sectional view of a metasurface element.

As illustrated in FIGS. 4 to 6, the metasurface element 20 includes the support body 21 described above and the metasurface 22 that is formed on the second surface 21b of the support body 21. The metasurface 22 includes the electrode 23, the metal pattern 24, and a metal layer 25. The metasurface 22 faces the window portion 11a on one side in the axial direction A with the support body 21 disposed therebetween, and faces the incident surface 40a of the electron multiplier 40 on the other side in the axial direction A.

The electrode 23 is formed on the second surface 21b of the support body 21, and has a substantially rectangular frame shape in plan view (when viewed in a direction perpendicular to the second surface 21b (direction parallel to the axial direction A)). A voltage is applied to the electrode 23 via the terminals 33.

The metal pattern 24 is formed in layer shape on the second surface 21b so as to be located inside the electrode 23 in plan view. The metal pattern 24 is disposed to emit electrons in response to the incidence of the electromagnetic wave. As a disposition of the metal pattern 24, for example, a pattern described in U.S. Unexamined Patent Publication No. 2016/0216201 may be used. In this example, the metal pattern 24 includes a plurality of conduction wires 24a that are disposed to emit electrons when an electromagnetic wave (for example, terahertz wave) in a certain band selected from the frequency band from a millimeter wave to infrared light is incident. For example, the plurality of conduction wires 24a have the same shape, and are arranged along a predetermined direction. Each of the conduction wires 24a is electrically connected to the electrode 23. Accordingly, the plurality of conduction wires 24a have the same potential. Namely, in this example, the metal pattern 24 has only metal patterns having the same potential.

The metal pattern 24 includes an oxide layer formed on the second surface 21b of the support body 21, and a metal layer formed on the oxide layer. The oxide layer includes a silicon dioxide layer formed on the second surface 21b, and a titanium oxide layer formed on the silicon dioxide layer. As one example, the thickness of the silicon dioxide layer is approximately 1 µm, and the thickness of the titanium oxide layer is approximately 10 nm. As one example, the material of the metal layer is gold, and the thickness of the metal layer is approximately 200 nm. The material of the metal pattern 24 does not contain the alkali metal. The electrode 23 has, for example, the same layer structure as that of the metal pattern 24.

The metal layer 25 is formed on the electrode 23 and the metal pattern 24 to cover the electrode 23 and the metal pattern 24. The metal layer 25 extends beyond the metal pattern 24 to reach a region R on the second surface 21b of the support body 21, the region R being not formed with the electrode 23 and the metal pattern 24. Namely, the metal layer 25 is provided to straddle the metal pattern 24 and the region R on the second surface 21b. In this example, the metal layer 25 is provided over the entire surface of the electrode 23, the entire surface of the metal pattern 24, and the entirety of the region R. In other words, the metal layer 25 is provided over the entirety of a region on the second surface 21b, the region being located inside an outer edge of the electrode 23.

The material of the metal layer 25 contains the alkali metal. The metal layer 25 is, for example, an oxide layer of the alkali metal. In this example, the alkali metal is cesium, and the metal layer 25 is a cesium oxide layer. The thickness of the metal layer 25 is, for example, approximately several angstroms. The work function of the material of the metal layer 25 is lower than the work function of the metallic material (gold in this example) forming the metal pattern 24.

Functions and Effects

In the metasurface element 20, the metal layer 25 containing the alkali metal is formed on the metal pattern 24. Accordingly, the band structure at the surface of the metal pattern 24 can be distorted to reduce the work function, and a potential barrier can be thinned. As a result, the probability of tunneling can be increased, and the sensitivity (electron emission ability) can be improved. In addition, in the metasurface element 20, the metal layer 25 containing the alkali metal is provided not only on the metal pattern 24 but also in the region R on the second surface 21b of the support body 21, the region R being not formed with the metal pattern 24. Accordingly, the resistance value of the second surface 21b of the support body 21 can be reduced, and the occurrence of charge-up on the metal pattern 24 can be suppressed. As a result, an event that it becomes difficult for the metasurface 22 to emit electrons due to the charge-up can be suppressed. The sensitivity of the metasurface element 20 is improved by the above configuration. The electron tube 1 including the metasurface element 20 described above can be used in various fields as an uncooled and highly sensitive detector capable of detection in a wide range from a mid-infrared region to a terahertz region. The charge-up is a phenomenon where the emitted electrons collide with the region R, in which the metal pattern 24 is not formed, to cause the region R to be positively or negatively charged. When the charge-up occurs, it is difficult for the metasurface 22 to emit electrons.

Figure 7:
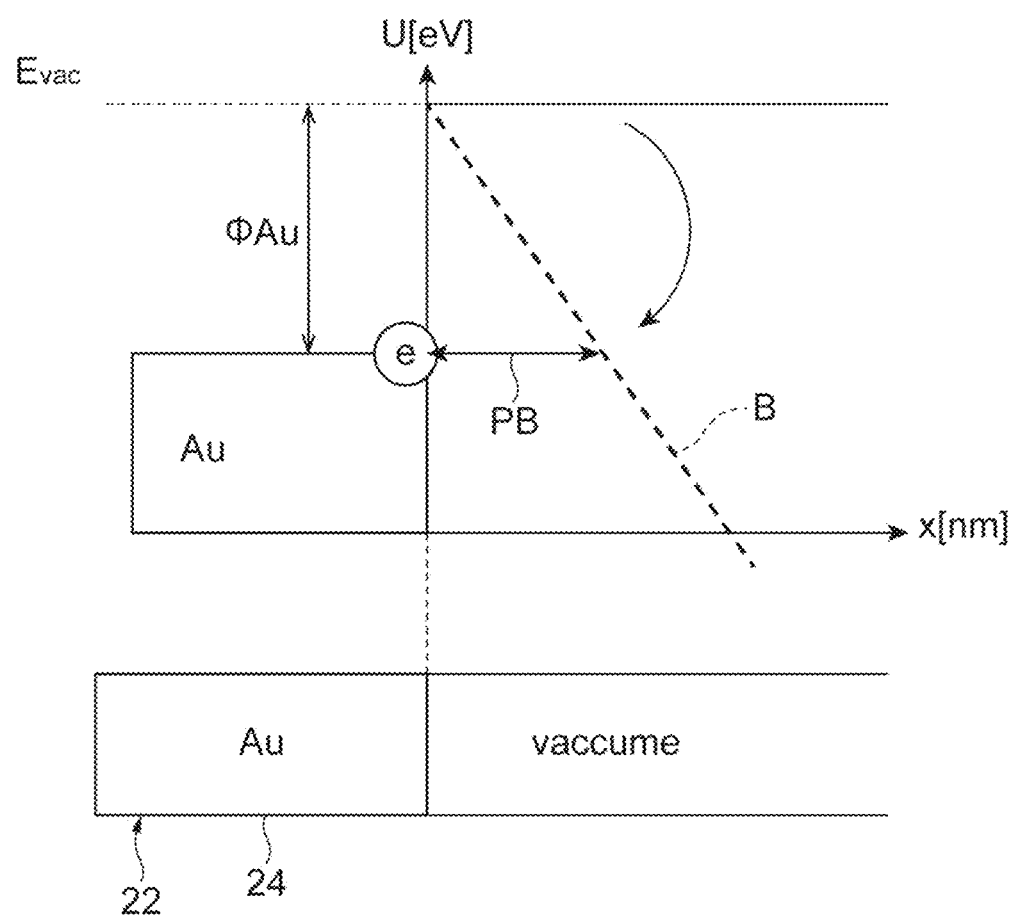
FIG. 7 is a view for describing a mode where electrons are emitted in a comparative example.
Figure 8:
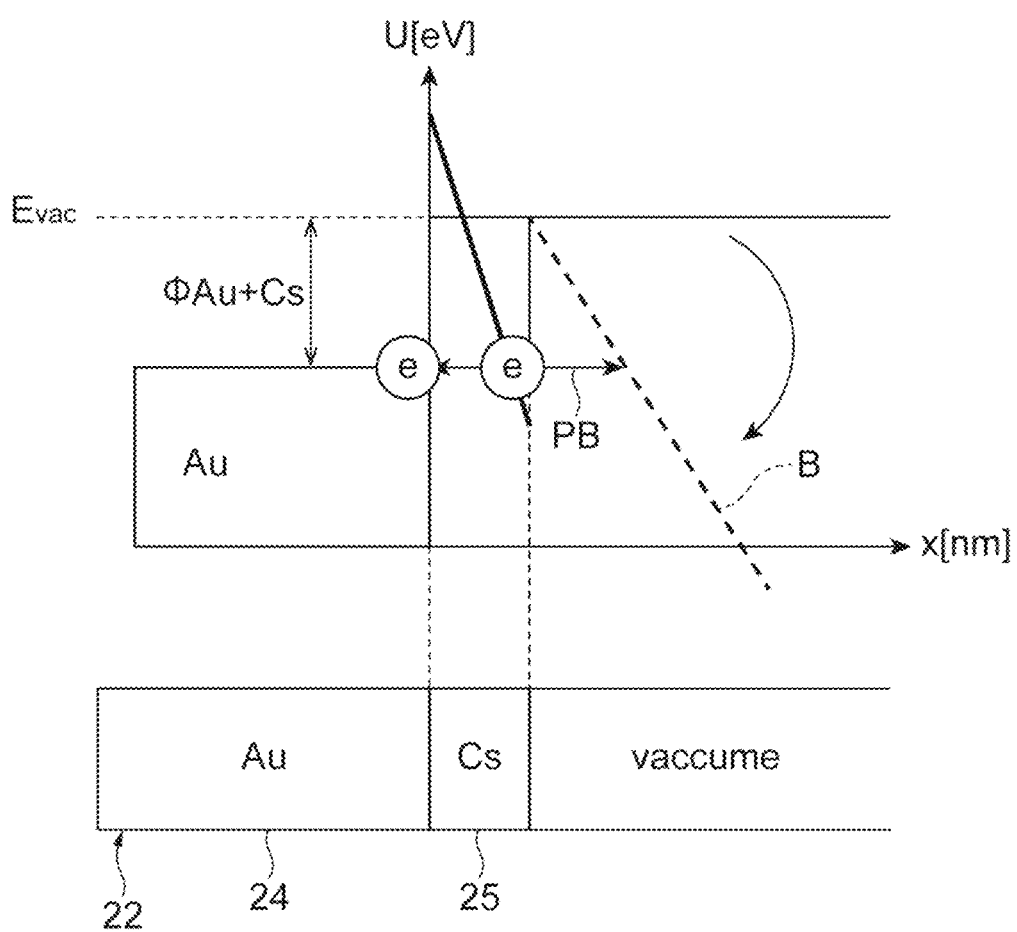
FIG. 8 is a view for describing a mode where electrons are emitted in the embodiment.

The above points will be further described with reference to the FIGS. 7 and 8. FIG. 7 is a view for describing a mode where electrons are emitted from the metasurface 22 in a comparative example, and FIG. 8 is a view for describing a mode where electrons are emitted from the metasurface 22 in the embodiment. The comparative example corresponds to a configuration where the metal layer 25 is not provided on the metasurface 22 of the embodiment. In FIGS. 7 and 8, the vertical axis represents potential energy U, and the horizontal axis represents a distance x from the metal pattern 24.

In both of the comparative example and the embodiment, when an electromagnetic wave is incident on the metasurface 22, as indicated by an arrow and a broken line B, the potential in the vicinity of the metal pattern 24 is inclined. Accordingly, as compared to a state where no voltage is applied, the quantity of electrons e passing through the potential barrier due to the tunnel effect is further increased.

As illustrated in FIGS. 7 and 8, when the metal layer 25 containing the alkali metal is formed on the metal pattern 24 (FIG. 8), a potential barrier PB is expected to be thinner as compared to when the metal layer 25 is not formed on the metal pattern 24 (FIG. 7). It is considered that the reason is, as illustrated in FIG. 8, that the band structure at the surface of the metal pattern 24 is distorted by the metal layer 25 to reduce the work function. Namely, it is considered that when the metal layer 25 is provided, the work function at the surface of the metal pattern 24 is smaller as compared to when the metal layer 25 is not provided. As a result, the probability of tunneling can be increased; and thereby, an effect that the sensitivity (electron emission ability) can be improved is expected.

In addition, in the metasurface element 20 of the embodiment, primary electrons emitted from the metasurface 22 collide with the metal pattern 24 or the like around the metasurface 22 to cause secondary electrons to be emitted. It is considered that since the metal layer 25 is formed on the metal pattern 24, not only the quantity of the emitted primary electrons but also the quantity of the emitted secondary electrons is increased.

Figure 9:
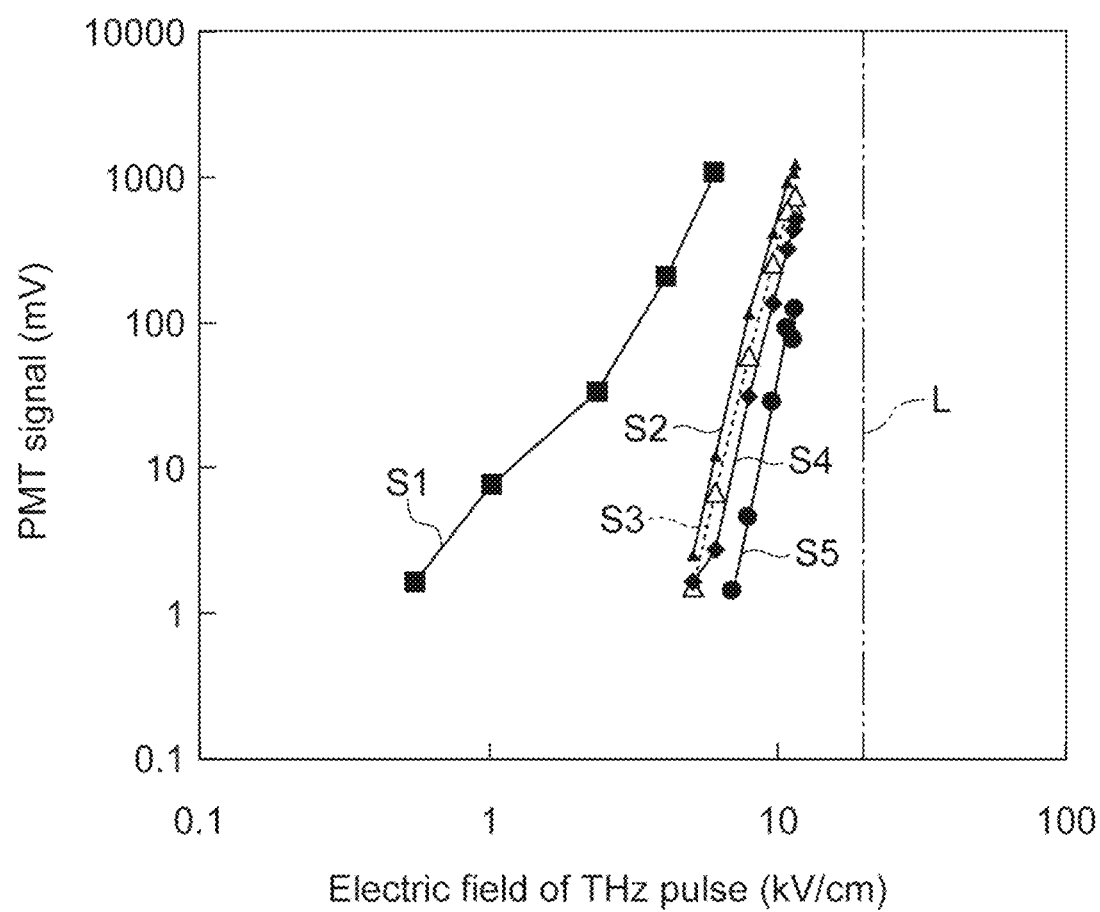
FIG. 9 is a graph showing results of an effect confirmation experiment.

FIG. 9 is a graph showing results of an effect confirmation experiment. In FIG. 9, the horizontal axis represents the intensity of an incident electromagnetic wave, and the vertical axis represents the magnitude of an output voltage. In the experiment, five electron tubes corresponding to the electron tube 1 of the embodiment were prepared as examples, and the sensitivity of each of the electron tubes was measured. Data S1 to S5 represent measurement data of the examples. An alternate long and two short dashes line L represents the maximum value of the sensitivity in the comparative example. The comparative example corresponds to the configuration where the metal layer 25 is not provided on the metasurface 22 of the embodiment.

As shown in FIG. 9, the sensitivity of any one of the examples was higher than that of the comparative example. In addition, in the examples, the sensitivity up to a maximum of 36 times that of the comparative example could be realized. Specifically, the threshold value of the comparative example was 20 kV/cm, whereas the threshold value of the example of the data S1 was 0.553 kV/cm.

Subsequently, the effect of the metasurface element 20 will be described. In the metasurface element 20, the metal layer 25 contains an oxide of the alkali metal. The alkali metal forming the metal layer 25 is cesium. Accordingly, the work function at the surface of the metal pattern 24 can be more effectively reduced.

The material of the metal pattern 24 contains gold. Accordingly, the conductivity of the metal pattern 24 can be greatly secured.

The metasurface 22 includes only the metal patterns 24 having the same potential as the metal pattern. Accordingly, since the insulating property between the metal patterns 24 is not required to be considered, the metal layer 25 can be easily provided in the region R on the second surface 21b of the support body 21, the region R being not formed with the metal pattern 24.

The support body 21 is made of silicon, quartz, sapphire, or zinc selenide. Accordingly, an electromagnetic wave in a frequency band included in the band from a millimeter wave to infrared light can be transmitted through the support body 21, and the electromagnetic wave can be incident on the metasurface 22 via the support body 21.

In the electron tube 1, the inside of the housing 10 is a vacuum. Accordingly, a residual gas inside the housing 10 can be adsorbed by the metal layer 25 (getter effect), so that the degree of vacuum inside the housing 10 can be increased.

The electron tube 1 includes the alkali metal dispenser 60 that is disposed inside the housing 10 to emit the alkali metal when energized. Accordingly, during production, the alkali metal vaporized by the energization of the alkali metal dispenser 60 can be emitted.

The electron tube 1 includes the monitoring member 34 that emits electrons in response to the incidence of a monitoring electromagnetic wave, and the housing 10 includes the window portion 11a through which the monitoring electromagnetic wave is transmitted. Accordingly, during production, the monitoring electromagnetic wave is incident on the monitoring member 34, and the quantity of electrons emitted from the monitoring member 34 is monitored, so that a change in work function at the surface of the metal pattern 24 can be identified.

Method for Producing Electron Tube

Figure 10:
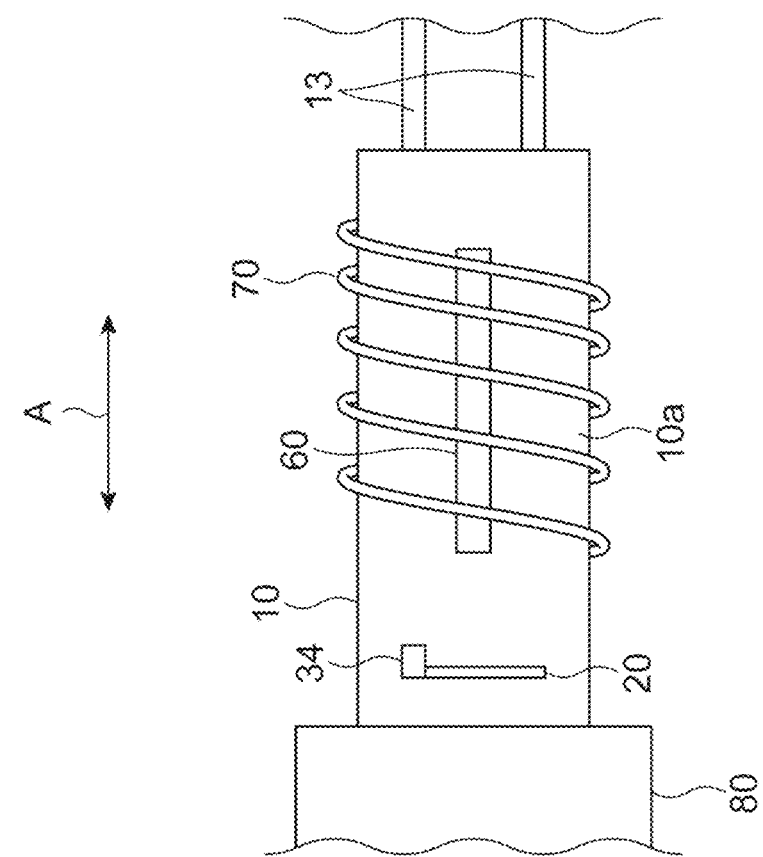
FIG. 10 is a view for describing a method for producing an electron tube.

One example of the method for producing the electron tube 1 described above will be described. First, as illustrated in FIG. 10, the metasurface element 20 and the alkali metal dispenser 60 are disposed inside the housing 10 (first step). The metasurface element 20 is a metasurface element before the metal layer 25 is formed on the metal pattern 24. In the first step, the holding unit 30, the electron multiplier 40, the electron collector 50, and the like that are other components of the electron tube 1 are also disposed inside the housing 10. The monitoring member 34 provided to the holding unit 30 is also disposed inside the housing 10. In the first step, the metasurface element 20 and the alkali metal dispenser 60 are disposed inside the housing 10 such that the metasurface element 20 is separated from the alkali metal dispenser 60 in the axial direction A.

Subsequently, the alkali metal vaporized by the energization of the alkali metal dispenser 60 is emitted, and the housing 10 is heated to disperse the alkali metal inside the housing 10 to form the metal layer 25 on the metal pattern 24, the metal layer 25 containing the alkali metal (second step). Before the second step is started, the housing 10 is sealed, and the inside of the housing 10 is maintained in vacuum.

As illustrated in FIG. 10, in the second step, a coil 70 disposed outside the housing 10 to surround the housing 10 is energized to heat a part 10a of the housing 10. The part 10a of the housing 10 is a part of the housing 10 in the axial direction A, and is a portion that surrounds the alkali metal dispenser 60. The coil 70 is spirally wound a plurality of times to surround the part 10a of the housing 10. When the coil 70 is energized, only the part 10a of the housing 10 is heated. As a result, the metasurface element 20 can be suppressed from being heated. In addition, in the second step, oxygen is supplied into the housing 10 to form the metal layer 25 on the metal pattern 24, the metal layer 25 containing an oxide of the alkali metal. For example, oxygen is supplied from an oxygen cylinder provided in an exhaust system and connected to an internal space of the housing 10. The oxygen cylinder is provided with a valve, and the quantity of supply of oxygen can be finely adjusted by the valve.

In addition, in the second step, while a monitoring electromagnetic wave is incident on the monitoring member 34, and the quantity of electrons emitted from the monitoring member 34 is monitored, the alkali metal dispenser 60 is energized. The monitoring electromagnetic wave is an electromagnetic wave having a wavelength different from the wavelength of an electromagnetic wave incident on the metasurface element 20. In this example, as described above, a metal film made of gold is formed on the surface of the monitoring member 34. The work function of gold is 5.47 eV which corresponds to 227 nm when converted to wavelength. Therefore, for example, when the monitoring member 34 is irradiated with ultraviolet light having a wavelength shorter than 227 nm as a monitoring electromagnetic wave, photoelectrons are emitted from the monitoring member 34 due to the photoelectric effect. For example, the electrons emitted from the monitoring member 34 are multiplied by the electron multiplier 40 to be collected by the electron collector 50. Alternatively, the electron tube 1 may include components which multiply and collect the electrons emitted from the monitoring member 34, separately from the electron multiplier 40 and/or the electron collector 50.

The quantity of the electrons emitted from the monitoring member 34 corresponds to the quantity of electrons emitted from the metal pattern 24. The reason is that the alkali metal emitted from the alkali metal dispenser 60 is deposited not only on the metal pattern 24 but also on the monitoring member 34. For this reason, when the work function at the surface of the monitoring member 34 is reduced, it can be regarded that the work function at the surface of the metal pattern 24 is also reduced. In other words, the monitoring member 34 can be regarded as a virtual metasurface. For example, a D2 (deuterium) lamp can be used as a light source that outputs a monitoring electromagnetic wave. In FIG. 10, a light source 80 is illustrated.

Figure 11:
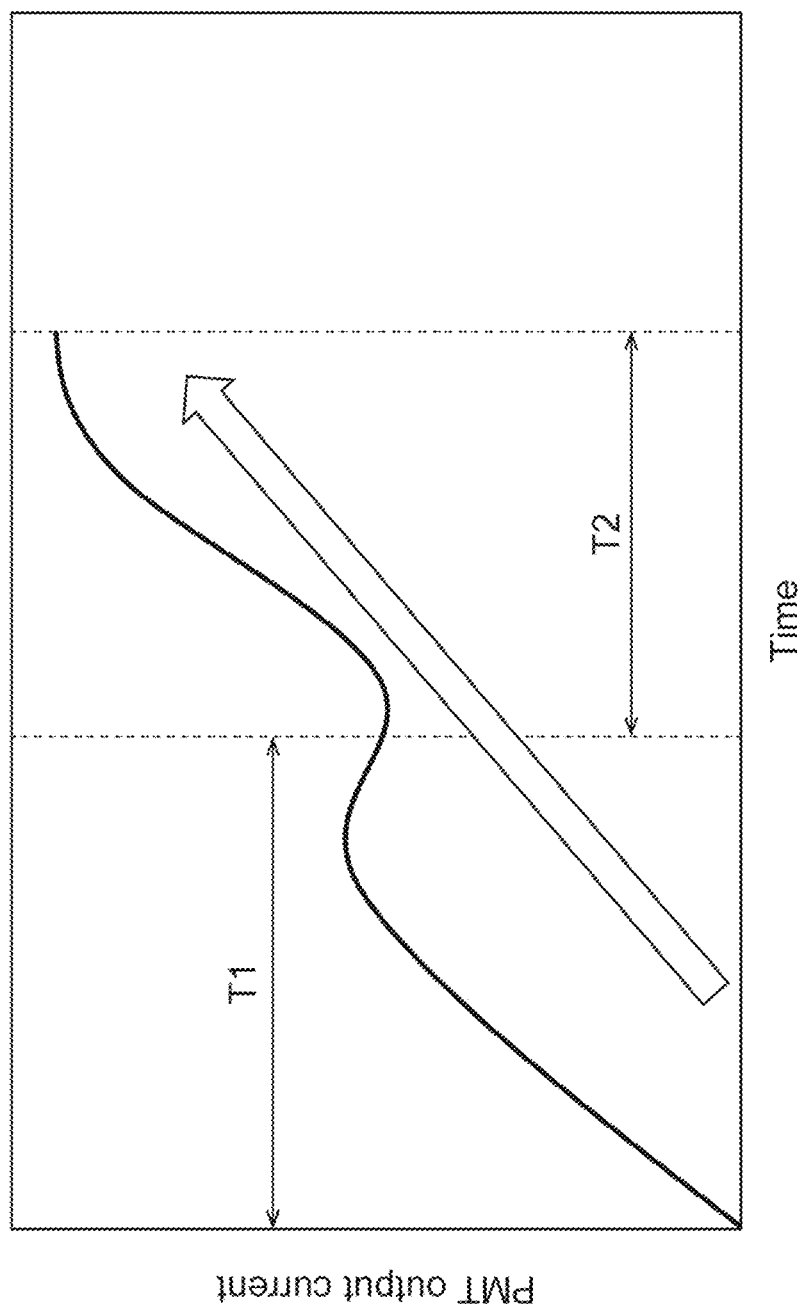
FIG. 11 is a graph for describing the method for producing an electron tube.

The second step will be further described with reference to FIG. 11. In FIG. 11, the horizontal axis represents the elapsed time from the start of energization, and the vertical axis represents the magnitude of an output current. As shown in FIG. 11, in a first section T1 immediately after the start of energization, a predetermined current is applied to the alkali metal dispenser 60 to introduce the alkali metal into the housing 10. Subsequently, in a second section T2, the predetermined current is applied to the alkali metal dispenser 60, and oxygen is supplied into the housing 10 at a predetermined pressure to introduce the alkali metal and the oxygen into the housing 10. The metal layer 25 can be formed on the metal pattern 24 by such a step. Incidentally, the quantity of current applied to the alkali metal dispenser 60 and/or the supply pressure of oxygen may be changed in accordance with the elapsed time.

As described above, in the method for producing the electron tube 1, the alkali metal vaporized in the alkali metal dispenser 60 (alkali supply source) is emitted, and the housing 10 is heated to disperse the alkali metal inside the housing 10 to form the metal layer 25 on the metal pattern 24, the metal layer 25 containing the alkali metal. Since the housing 10 is heated to disperse the alkali metal inside the housing 10, the metal layer 25 can be reliably formed on the metal pattern 24. Namely, if the housing 10 is not heated, there is a possibility that the alkali metal emitted stays in the vicinity of the alkali metal dispenser 60; however, since the housing 10 is heated, such a situation can be suppressed. Therefore, according to the method for producing the electron tube 1, the metal layer 25 containing the alkali metal can be suitably formed on the metal pattern 24. Namely, the electron tube 1 of which the sensitivity is improved due to the above-described reason can be produced.

The alkali metal dispenser 60 is used as an alkali supply source. Accordingly, the amount of energization, the time of energization, or the like of the alkali metal dispenser 60 can be adjusted to control the quantity of the alkali metal emitted, so that the metal layer 25 can be formed with good reproducibility. In addition, the control of the quantity of the alkali metal emitted, which is performed by using the alkali metal dispenser 60, is unlikely to cause an operator-dependent variation, and can be easily automated.

In the second step, oxygen is supplied into the housing 10 to form the metal layer 25 on the metal pattern 24, the metal layer 25 containing an oxide of the alkali metal. Accordingly, the metal layer 25 containing an oxide of the alkali metal can be formed on the metal pattern 24.

In the second step, the coil 70 disposed outside the housing 10 to surround the housing 10 is energized to heat the housing 10. Accordingly, the housing 10 can be effectively heated.

In the second step, the inside of the housing 10 is a vacuum. Accordingly, a residual gas inside the housing 10 can be adsorbed by the metal layer 25 (getter effect), so that the degree of vacuum inside the housing 10 can be increased. In addition, the alkali metal can be handled in vacuum.

In the second step, while a monitoring electromagnetic wave is incident on the monitoring member 34, and the quantity of electrons emitted from the monitoring member 34 is monitored, the alkali metal dispenser 60 is energized. Accordingly, the quantity of electrons emitted from the monitoring member 34 is monitored, so that a change in work function at the surface of the metal pattern 24 can be identified. As a result, the metal layer 25 can be formed with better reproducibility. The monitoring using the monitoring member 34 describe above is effective when it is difficult to use a light source that outputs an electromagnetic wave to which the electron tube 1 has sensitivity (for example, a terahertz light source that outputs a terahertz wave). When this application is filed, the terahertz light source is very expensive and is not easy to use.

In the first step, the metasurface element 20 and the alkali metal dispenser 60 are disposed inside the housing 10 such that the metasurface element 20 is separated from the alkali metal dispenser 60, and in the second step, the part 10a of the housing 10 is heated, the part 10a surrounding the alkali metal dispenser 60. Accordingly, since the part 10a of the housing 10 is heated, the part 10a surrounding the alkali metal dispenser 60, the metal pattern 24 can be suppressed from being heated. Namely, the activity at room temperature can be realized. As a result, the metal pattern 24 and the metal layer 25 can be suppressed from being alloyed, so that the metal layer 25 can be more suitably formed.

For example, in the method for producing the electron tube 1 described above, the temperature of the metasurface 22 is maintained at approximately 100° C. or less. The temperature of the metasurface 22 may be maintained at approximately 60° C. or less, or may be maintained at approximately 25° C. Meanwhile, the part 10a of the housing 10 is heated to approximately 200° C. by the coil 70. Namely, in the second step, the temperature of the metasurface 22 is maintained at a temperature lower than the temperature of the part 10a of the housing 10.

In the method for producing the electron tube 1 described above, the alkali metal is supplied by using the alkali metal dispenser 60; however, as another method, a method using an ampoule or a pellet can be considered. The former is a method by which an operator uses an ampoule tube to introduce the alkali metal into the housing 10 and pulls out the ampoule tube from the housing 10 after the introduction is completed. This method has a drawback that the reproducibility in forming the metal layer 25 is lower and the temperature of the metasurface 22 is more likely to become high as compared to the production method of the embodiment.

The method using a pellet is a method by which a mass (pellet) of the alkali metal disposed inside the housing 10 is heated at a high frequency to supply the alkali metal. This method has a drawback that the temperature of the metasurface 22 is more likely to become high and the quantity of supply of the alkali metal is more difficult to control as compared to the production method of the embodiment. The production method of the embodiment has an advantage that the temperature of the metasurface 22 is less likely to become high, the quantity of supply of the alkali metal is easier to control, and the reproducibility in forming the metal layer 25 is higher as compared to this method.

One embodiment of the present disclosure has been described above; however, the present disclosure is not limited to the embodiment. The materials and the shapes of each configuration are not limited to the materials and the shapes described above, and various materials and shapes can be adopted. For example, the electrode 23 is not limited to having a rectangular frame shape, and may have any shape such as a rectangular shape. The metal pattern 24 may have any disposition as long as the metal pattern 24 can emit electrons in response to the incidence of an electromagnetic wave.

In the embodiment, the metal layer 25 is formed on the electrode 23 and the metal pattern 24; however, the metal layer 25 may be formed only on the metal pattern 24. In the embodiment, the metal layer 25 is provided over the entirety of the surface of the metal pattern 24; however, the metal layer 25 may be formed on at least a part of the metal pattern 24. In the embodiment, the metal pattern 24 includes only metal patterns having the same potential; however, the metal pattern 24 may include two or more metal patterns to which different potentials are applied.

The housing 10 may include a second window portion through which a monitoring electromagnetic wave is transmitted, separately from the window portion 11a. The metasurface 22 may be formed on the first surface 21a of the support body 21. In this case, the support body 21 may not necessarily be transmissive to an electromagnetic wave transmitted through the window portion 11a. The electron multiplier 40 and the electron collector 50 are not limited to the above-described configurations, and may have any configurations. The monitoring member 34 and/or the alkali metal dispenser 60 may not be disposed inside the housing 10.

The metal layer 25 may be a monatomic layer of the alkali metal. In this case, the work function at the surface of the metal pattern 24 can be effectively reduced. For example, the metal layer 25 may be a monatomic layer of cesium. The material of the metal pattern 24 is not limited to gold, and may be platinum, aluminum, graphene, silver, or copper. Also in this case, the conductivity of the metal pattern 24 can be greatly secured. The material of the metal layer 25 may be an alkali metal other than cesium. Another alkali supply source may be used instead of the alkali metal dispenser 60.

In the embodiment, the metasurface element 20 is configured as a transmission type in which an electromagnetic wave transmitted through the support body 21 is incident on the metasurface 22; however, the metasurface element 20 may be configured as a reflection type in which an electromagnetic wave is incident on the metasurface 22 from a side opposite to the support body 21, and electrons are emitted from the metasurface 22 to the side opposite to the support body 21. In this case, the support body 21 may not necessarily be made of a material that is transmissive to an electromagnetic wave.

The invention claimed is:

1. A metasurface element comprising:
   a support body; and
   a metasurface formed on a surface of the support body,
   wherein the metasurface includes a metal pattern that is disposed to emit an electron, due to field emission, in response to incidence of an electromagnetic wave, and a metal layer that contains an alkali metal and is formed on the metal pattern, and
   the metal layer extends beyond the metal pattern to reach a region on the surface of the support body, the region being not formed with the metal pattern.

2. The metasurface element according to claim 1,
   wherein the metal layer is a monatomic layer of the alkali metal.

3. The metasurface element according to claim 1,
   wherein the metal layer contains an oxide of the alkali metal.

4. The metasurface element according to claim 1,
   wherein the alkali metal is cesium.

5. The metasurface element according to claim 1,
   wherein a material of the metal pattern includes gold, platinum, aluminum, graphene, silver, or copper.

6. The metasurface element according to claim 1,
   wherein the metasurface includes only metal patterns having the same potential as the metal pattern.

7. The metasurface element according to claim 1,
   wherein the support body is made of silicon, quartz, sapphire, or zinc selenide.

8. An electron tube comprising:
   the metasurface element according to claim 1;
   a housing including a first window portion through which the electromagnetic wave is transmitted and accommodating the metasurface element; and
   an electron multiplier disposed inside the housing to multiply an electron emitted from the metasurface element.

9. The electron tube according to claim 8,
   wherein an inside of the housing is a vacuum.

10. The electron tube according to claim 8, further comprising:
    an alkali metal dispenser disposed inside the housing to emit the alkali metal when energized.

11. The electron tube according to claim 8, further comprising:
a monitoring member disposed inside the housing to emit an electron in response to incidence of a monitoring electromagnetic wave having a wavelength different from a wavelength of the electromagnetic wave,
wherein the housing includes a second window portion through which the monitoring electromagnetic wave is transmitted.

12. The metasurface element according to claim 1, wherein the metal pattern is disposed to emit an electron, due to field emission, in response to incidence of a terahertz wave.

13. A method for producing an electron tube, the method comprising:
a first step of disposing a metasurface element and an alkali supply source inside a housing, wherein the metasurface element includes a support body and a metasurface that is formed on a surface of the support body and includes a metal pattern disposed to emit an electron, due to field emission, in response to incidence of an electromagnetic wave; and
a second step of causing the alkali supply source to emit a vaporized alkali metal, and heating the housing to disperse the alkali metal inside the housing to form a metal layer on the metal pattern, the metal layer containing the alkali metal.

14. The method for producing an electron tube according to claim 13,
wherein the alkali supply source is an alkali metal dispenser that emits the alkali metal when energized.

15. The method for producing an electron tube according to claim 13,
wherein in the second step, oxygen is supplied into the housing to form the metal layer on the metal pattern, the metal layer containing an oxide of the alkali metal.

16. The method for producing an electron tube according to claim 13,
wherein in the second step, a coil disposed outside the housing to surround the housing is energized to heat the housing.

17. The method for producing an electron tube according to claim 13,
wherein in the second step, an inside of the housing is a vacuum.

18. The method for producing an electron tube according to claim 13,
wherein in the first step, a monitoring member that emits an electron in response to incidence of a monitoring electromagnetic wave having a wavelength different from a wavelength of the electromagnetic wave is further disposed inside the housing, and
in the second step, while the monitoring electromagnetic wave is incident on the monitoring member and a quantity of the electron emitted from the monitoring member is monitored, the alkali supply source is caused to emit the alkali metal.

19. The method for producing an electron tube according to claim 13,
wherein in the first step, the metasurface element and the alkali supply source are disposed inside the housing such that the metasurface element is separated from the alkali supply source, and
in the second step, a part of the housing is heated, the part surrounding the alkali supply source.

* * * * *